June 23, 1942.  C. W. MINNICK  2,287,353

TRUSS PAD

Filed Oct. 1, 1941

Charles W. Minnick
INVENTOR

BY Victor J. Evans & Co.
ATTORNEYS

Patented June 23, 1942

2,287,353

UNITED STATES PATENT OFFICE 2,287,353

TRUSS PAD

Charles W. Minnick, Baltimore, Md.

Application October 1, 1941, Serial No. 413,213

4 Claims. (Cl. 128—117)

The present invention relates to improvements in truss pads and has for an important object thereof to provide a truss pad of generally improved design.

Another object of the invention is to provide a truss pad which is exceptionally efficient for maintaining hernia or similar conditions of protrusion or protuberance in a retracted or compressed manner.

A further object of the invention is the provision of a truss pad of the aforesaid character having a plurality of yielding tubular pad members of resilient nature.

Other objects and advantages of the invention will become apparent as the description progresses.

In the accompanying drawing forming a part of this specification and in which like numerals are employed to designate corresponding parts throughout:

Figure 1:
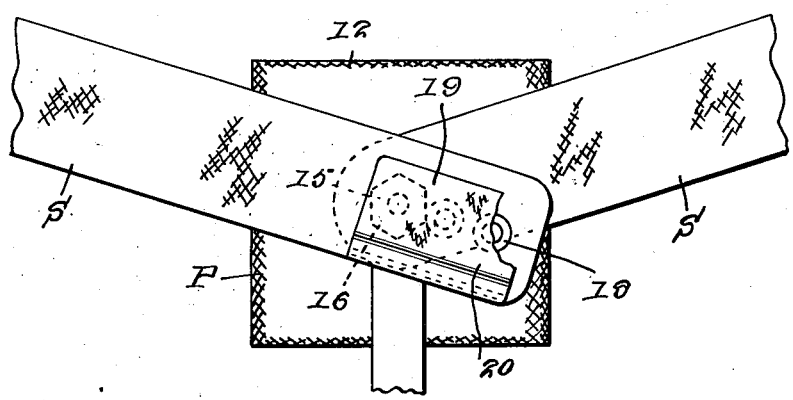
Figure 1 is a front elevational view of the pad structure.

Referring to the drawing, wherein is illustrated a preferred example of the invention, 10 designates each of a plurality of, in the present instance five, tubular members which constitute the interior main filler structure of my truss pad, these members embodying elongated sections of yielding and resilient tubing formed of rubber or similarly suitable material.

Figure 2:
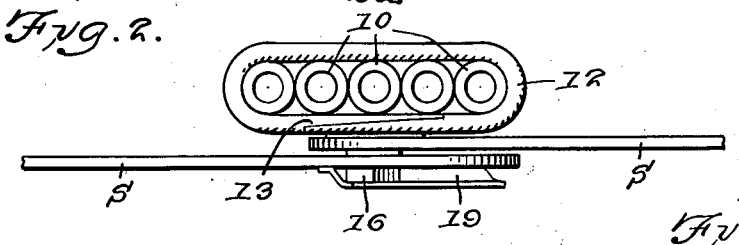
Figure 2 is a top end view of the same.
Figures 3, 4:
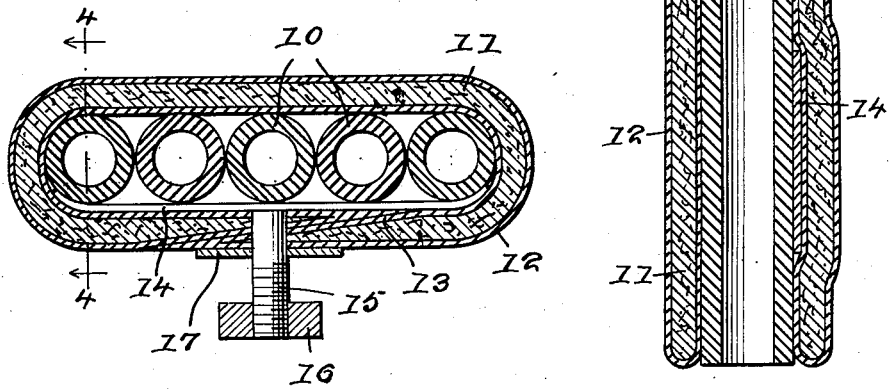
Figure 3 is an enlarged transverse sectional view through the same.
Figure 4 is a longitudinal section taken on line 4—4 of Figure 3.

In assembling the pad the parallel tubular members 10 are covered by a wrapper or sheath consisting of a filling of cushioning material such as felt, indicated at 11, within a relatively thin exterior covering 12 of flexible and elastic material such as soft rubber sheeting. As shown to advantage at Figures 2 and 3 the wrapper is folded circumferentially about the tubes 10 with the end portions overlapping, as indicated at 13, so that the ends of the tubes are exposed and open to afford unobstructed circulation of air longitudinally therethrough. Between the wrapper and the tubes at the outer portion of the pad is interposed and securely fixed a rigid plate 14 preferably formed of rustproof metal curved at the ends in correspondence with the curvature of the end tubes and carrying, at its center portion, a stud 15 which is adapted to extend through apertures in the overlapping front portions of the wrapper and to accommodate, on its outer threaded end portion, a fastening nut 16. A washer 17 is fitted about the stud and against the outer surface of the wrapper as shown to advantage at Figure 3.

The completed pad, which may assume a rectangular form as generally indicated at P, may be effectually held against the desired part of the body by a strap S which may merely consist of an elastic webbing and having apertures 18 at the ends engageable with the stud 15 and preferably carrying a flap 19 of flexible material such as rubber or leather, having the lower marginal portion stitched to an end part of the strap S, as indicated at 20. This flap is designed to normally cover the protruding end of the stud 15 and the nut 16 mounted thereon to secure the strap ends on the pad.

I have found that a truss pad of this nature is particularly efficient because the normally cylindrical resilient tube sections 10 afford a filler structure which exerts a firm pressure yet are sufficiently yieldable to obviate discomfort and, in conjunction with the cushioning wrapper, present a pad which is very efficient for hernia and similar conditions. Furthermore, this pad may be easily retained in selected position and is effectively ventilated.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a truss, a pad comprising a plurality of tubular resilient filler sections, and a wrapper of cushioning material disposed about the said sections, the said wrapper embracing the said tubular sections in such manner that the ends of the sections are disposed in open uncovered condition for the circulation of air through the sections.

2. In a truss pad, a plurality of parallel resilient tube sections, a wrapper of cushioning material wrapped circumferentially about the sections, a rigid plate disposed between the tubular sections and the wrapper, and a nut carrying stud secured to the said plate and extending through the wrapper for connection of a holding strap.

3. In a truss, a plurality of resilient tubular sections, a wrapper of cushioning material wrapped circumferentially over the sections, a plate secured between the tubular sections and the wrapper so that the sections are retained in such arrangement as to provide a flat rectangular shaped pad, a stud secured to and projecting from the plate, a fastening nut threadedly engaging the outer portion of the stud, an elastic strap having apertures in the ends thereof and engageable with the stud, and a flap element attached to the outermost end portion of the strap for covering the stud and nut.

4. In a truss pad, a plurality of resilient tubular sections, and a wrapper embracing the said tubular sections so as to retain the same in parallel and in row arrangement with the ends open and uncovered.

CHARLES W. MINNICK.